United States Patent
Bertony (10) Patent No.: US 8,297,930 B2
(45) Date of Patent: Oct. 30, 2012

(54) VERTICAL AXIS WIND TURBINE

(75) Inventor: Joseph Bertony, Hornsby North (AU)

(73) Assignee: Windworks Engineering Limited, Limassol (CY)

( * ) Notice: Subject to any disclaimer, the term of this patent is extended or adjusted under 35 U.S.C. 154(b) by 736 days.

(21) Appl. No.: 12/296,362

(22) PCT Filed: Mar. 21, 2007

(86) PCT No.: PCT/AU2007/000340
§ 371 (c)(1),
(2), (4) Date: Aug. 25, 2009

(87) PCT Pub. No.: WO2007/115353
PCT Pub. Date: Oct. 18, 2007

(65) Prior Publication Data
US 2009/0317255 A1  Dec. 24, 2009

(30) Foreign Application Priority Data

Apr. 7, 2006 (AU) .................................. 2006901827
Jun. 1, 2006 (AU) .................................. 2006902971

(51) Int. Cl.
*F03D 3/00* (2006.01)
(52) U.S. Cl. .................. 416/176; 415/4.4; 416/DIG. 9; 416/23; 416/132 B; 416/196 A
(58) Field of Classification Search .............. 416/DIG. 9, 416/176, 23, 24, 132 B, 196 A; 415/4.2, 415/4.4, 907, 71
See application file for complete search history.

(56) References Cited

U.S. PATENT DOCUMENTS

| 4,061,926 A | * | 12/1977 | Peed ................................ 290/55 |
| 4,830,570 A | * | 5/1989 | Benesh .......................... 415/4.4 |
| 6,666,650 B1 | * | 12/2003 | Themel ..................... 416/200 R |
| 7,132,760 B2 | * | 11/2006 | Becker ............................. 290/55 |
| 2004/0219019 A1 | * | 11/2004 | Taylor et al. .............. 416/132 B |
| 2006/0263198 A1 | * | 11/2006 | Kinkaid ......................... 415/4.2 |

FOREIGN PATENT DOCUMENTS

| DE | 3519700 | | 12/1986 |
| JP | 11343959 A | * | 12/1999 |
| JP | 2005320868 | | 11/2005 |
| RU | 2182258 | | 5/2002 |
| WO | 2004/092578 | | 10/2004 |
| WO | WO 2004092578 A1 | * | 10/2004 |
| WO | 2006/063380 | | 6/2006 |

OTHER PUBLICATIONS

International Search Report, Australian Patent Office, PCT/AU2007/000340, May 30, 2007.

* cited by examiner

*Primary Examiner* — Christopher Verdier
*Assistant Examiner* — Andrew C Knopp
(74) *Attorney, Agent, or Firm* — Andrus, Sceales, Starke & Sawall, LLP (57) ABSTRACT

A vertical axis wind turbine has a plurality of main blades each of which is relatively thin. The blades each have a thickened portion extending along the trailing edge of each blade. Furthermore, each blade is fabricated in at least two sub-sections, wherein at least one strut extends between a central support column and a junction where the blade sub-sections abut.

2 Claims, 8 Drawing Sheets

VERTICAL AXIS WIND TURBINE

CROSS REFERENCE TO RELATED APPLICATION

The present application is the U.S. national stage application of International Application PCT/AU2007/000340, filed Mar. 21, 2007, which international application was published on Oct. 18, 2007 as International Publication WO 2007/115353. The International Application claims priority of Australian Patent Application 2006902971, filed Jun. 1, 2006 and Australian Patent Application 2006901827, filed Apr. 7, 2006.

FIELD OF THE INVENTION

The present invention relates to vertical axis wing turbines and, in particular, to the blades and the fabrication thereof.

BACKGROUND ART

International Patent Application No. PCT/AU2005/001621 discloses a vertical axis wind turbine in which the blades are relatively thin. Depending upon the size of the wind turbine, the blades may have a thickness which varies between approximately 1 mm and approximately 200-300 mm. One of the problems of fabricating vertical axis wind turbine blades which are thin is that the blade is not very rigid. There is also a tendency for the blade to flutter or vibrate whilst in use. Since wind turbines can be subjected to very strong winds and thus substantial loads, it is necessary for the blades to be mounted in such a way that they can withstand the loads to which they are subjected.

Preferably the blades are moulded from resin reinforced with carbon fibres or are pressed from sheet aluminium. Furthermore, each surface of the thin blades has an aerodynamic function. Consequently, the blade must be mounted in such a way that the mounting does not itself interfere to any appreciable extent with the aerodynamic performance of the blades.

OBJECT OF THE INVENTION

The genesis of the present invention is a desire to increase blade rigidity and/or reduce the incidence or severity of such blade flutter and to meeting these inherently conflicting requirements.

SUMMARY OF THE INVENTION

In accordance with a first aspect of the present invention there is disclosed in a vertical axis wind turbine having a plurality of main blades each of which is relatively thin, the improvement comprising a thickened portion extending along the trailing edge of each said blade.

In accordance with another aspect of the present invention a method of construction of the main blade of a vertical axis wind turbine is also disclosed.

In accordance with a further aspect of the present invention there is disclosed a vertical axis wind turbine having a central support column and at least one blade, the or each blade being fabricated in at least two sub-sections, wherein at least one strut extends between said central support column and a junction where said blade sub-sections abut, and said strut is thin in vertical extent.

In accordance with a still further aspect of the present invention there is provided a vertical axis wind turbine blade extending vertically a predetermined length and extending a width horizontally between a blade mounting end and a blade distal end, said blade mounting end configured for vertically mounting to a central core wherein said blade is circularly curved by a predetermined curvature along a predetermined horizontal width from said blade mounting end, said blade being circularly elliptically curved by a predetermined curvature along a predetermined horizontal width from an end of said circular curving, said blade being substantially flat from an end of said circular-eliptical curving to said blade distal end, wherein said blade in horizontal cross-section is substantially uniform along said blade length.

BRIEF DESCRIPTION OF THE DRAWINGS

Preferred embodiments of the present invention will now be described with reference to the drawings in which.

DETAILED DESCRIPTION

Figure 1:
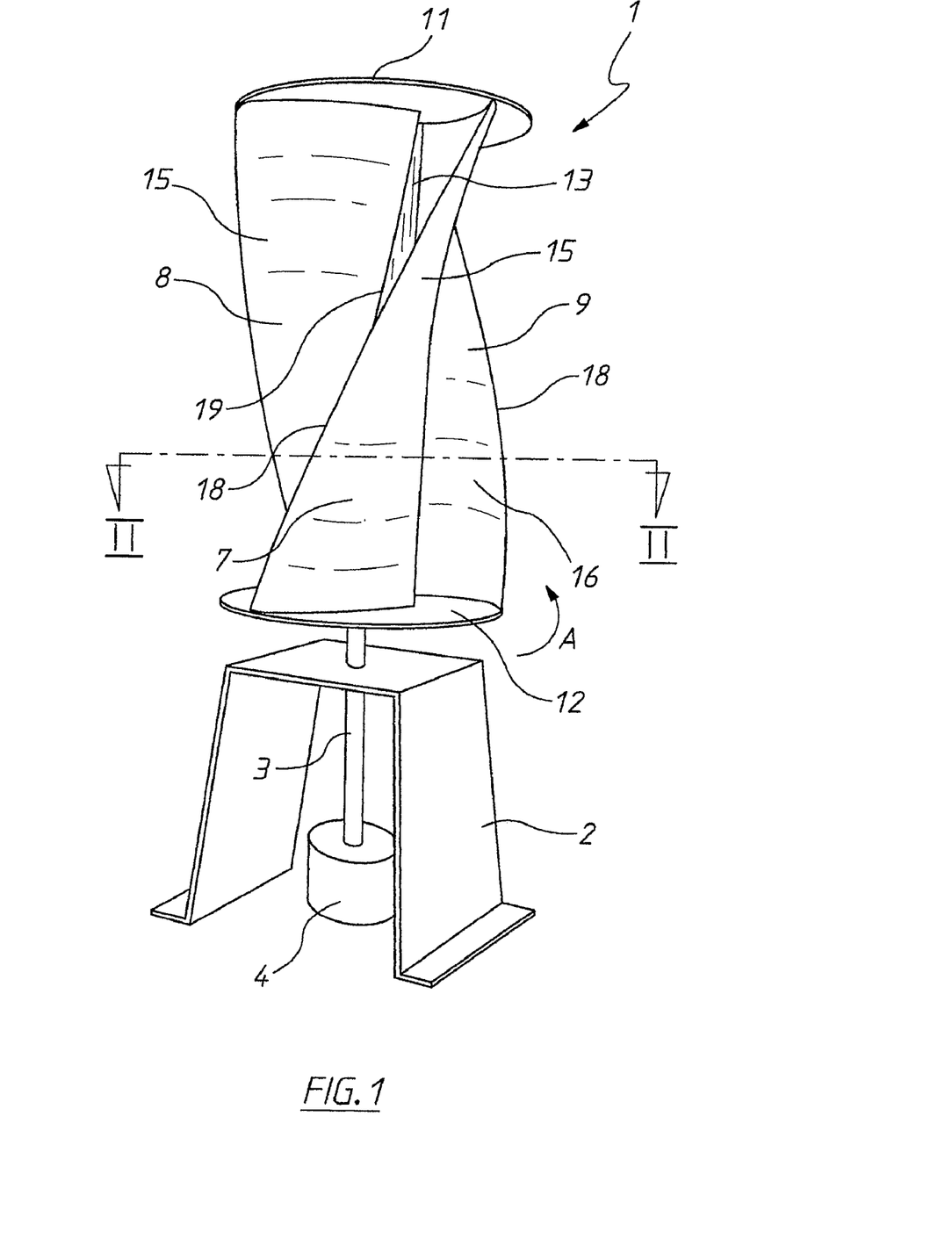
FIG. 1 is a perspective view of the vertical axis wind turbine of a first embodiment.

As seen in FIG. 1, a vertical axis wind turbine 1 of a first embodiment has a support structure 2 on which is mounted a vertical shaft 3 which drives a generator schematically illustrated at 4.

The turbine 1 has three main blades 7, 8, 9 which extend between an upper disc 11 and a lower disc 12. A central cylindrical core 13 extends between the two discs 11, 12, and is coaxial with the shaft 3, there is a vertical gap between each of the main blades 7, 8, 9 and the central core 13. The wind turbine 1 rotates in an anticlockwise direction as seen in FIG. 1 and as indicted by arrow A. Thus each of the main blades 7, 8, 9 has a leading surface 15 and a trailing surface 16 each of which is curved. Each leading surface 15 generates lift and each trailing surface 16 generates drag. Thus the blades 7, 8, 9 function as the headsail of a conventional yacht with the leading surface 15 moving into a wind, whilst the trailing surface 16 functions as the mainsail of a conventional yacht sailing before the wind and therefore is driven by a trailing wind. Each of the main blades 7, 8, 9 has a trailing edge 18 and a leading edge 19. Each of the main blades, 7, 8, 9 is formed from sheet material with a substantially constant or uniform cross-sectional thickness, the sheet material being provided with a 90° vertical twist about the central core 13 thereby resulting in a 90° vertical pitch.

The blades 7, 8, 9 are preferably moulded from resin reinforced with carbon fibres or pressed from sheet aluminium.

Figure 2:
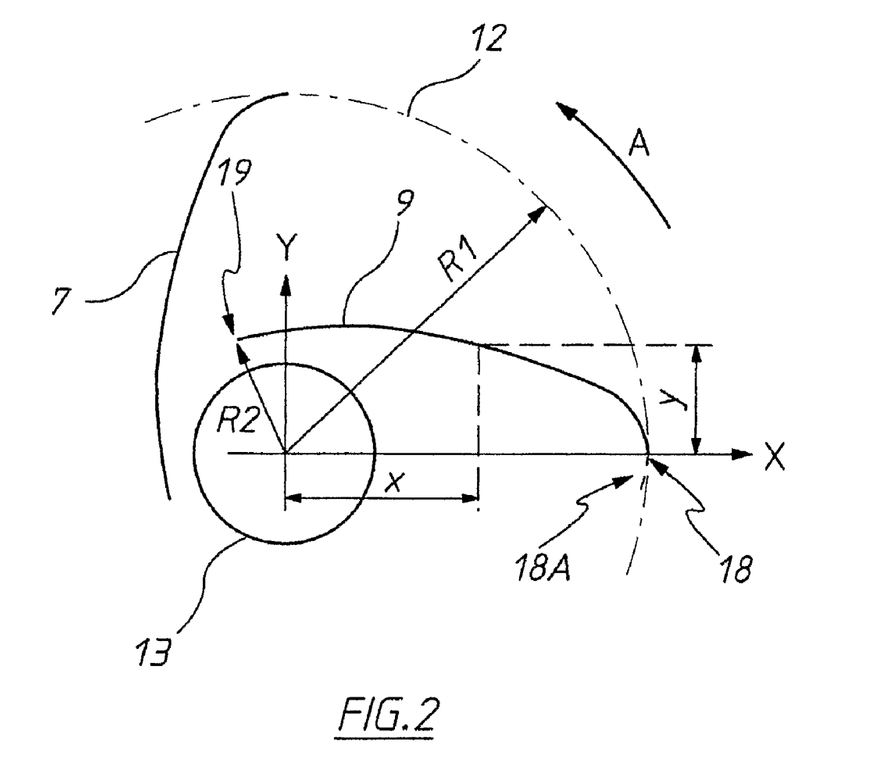
FIG. 2 is a partial cross-sectional view taken along the line II-II of FIG. 1.

As best seen in relation to FIG. 2, each of the main blades 7, 8, 9 can be regarded as a circular to eliptical projection such that each point on the blade surface is governed by the function $$y=(R1^2-x^2)^{1/2}R2/R1$$

where R1 is the radius of the discs 11, 12 and thus constitutes the maximum radial extent of each main blade and R2 is the minimum radial extent of each main blade.

As also seen in FIG. 2, each of the main blades can have a trailing edge 18 which terminates on the junction of the x axis and the circle having radius R1 or can be extended slightly as indicated by dotted lines in FIG. 2 a so as to lie upon the circle of radius R1 and thus having a trailing edge 18A as indicated in FIG. 2.

Figure 4:
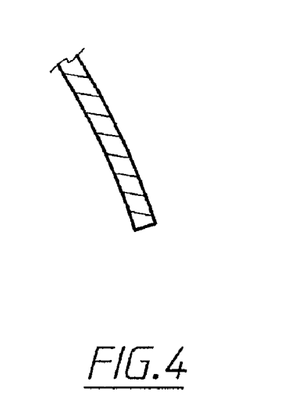
FIG. 4 is a similar cross-sectional view taken through the trailing edge of a prior art main blade.

In prior art wind turbine arrangements where the turbine blades are made from thin sheet material, the trailing edge of each blade is simply formed from cutting the material and thus the trailing edge has a generally rectangular configuration as illustrated in FIG. 4. However, in accordance with a first embodiment of the present invention the trailing edge 18 is formed as a thickened portion 28 which extends along substantially the entire length of the trailing edge. The thickened portion 28 is preferably asymmetrical and preferably extends in the trailing direction of the main blade but not in the leading direction of the main blade.

Figure 3:
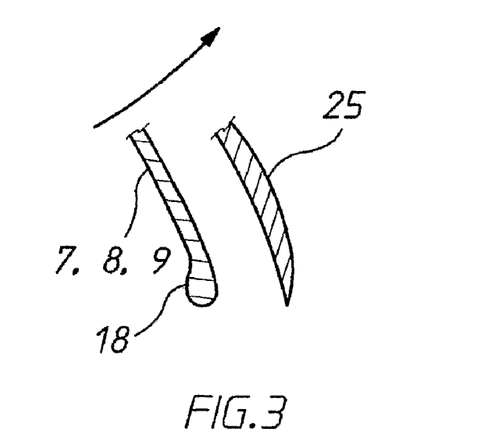
FIG. 3 is a partial vertical cross-section view taken of the trailing edge of one of the main blades and showing part of an auxiliary blade spaced therefrom.

Also extending along the trailing edge 18 is an auxiliary blade 25 which, as indicated by broken lines in FIG. 3, is preferably provided but is not essential. The auxiliary blade 25 is spaced from the main blade 7, 8, 9 by a small but substantially uniform spacing.

Figure 5:
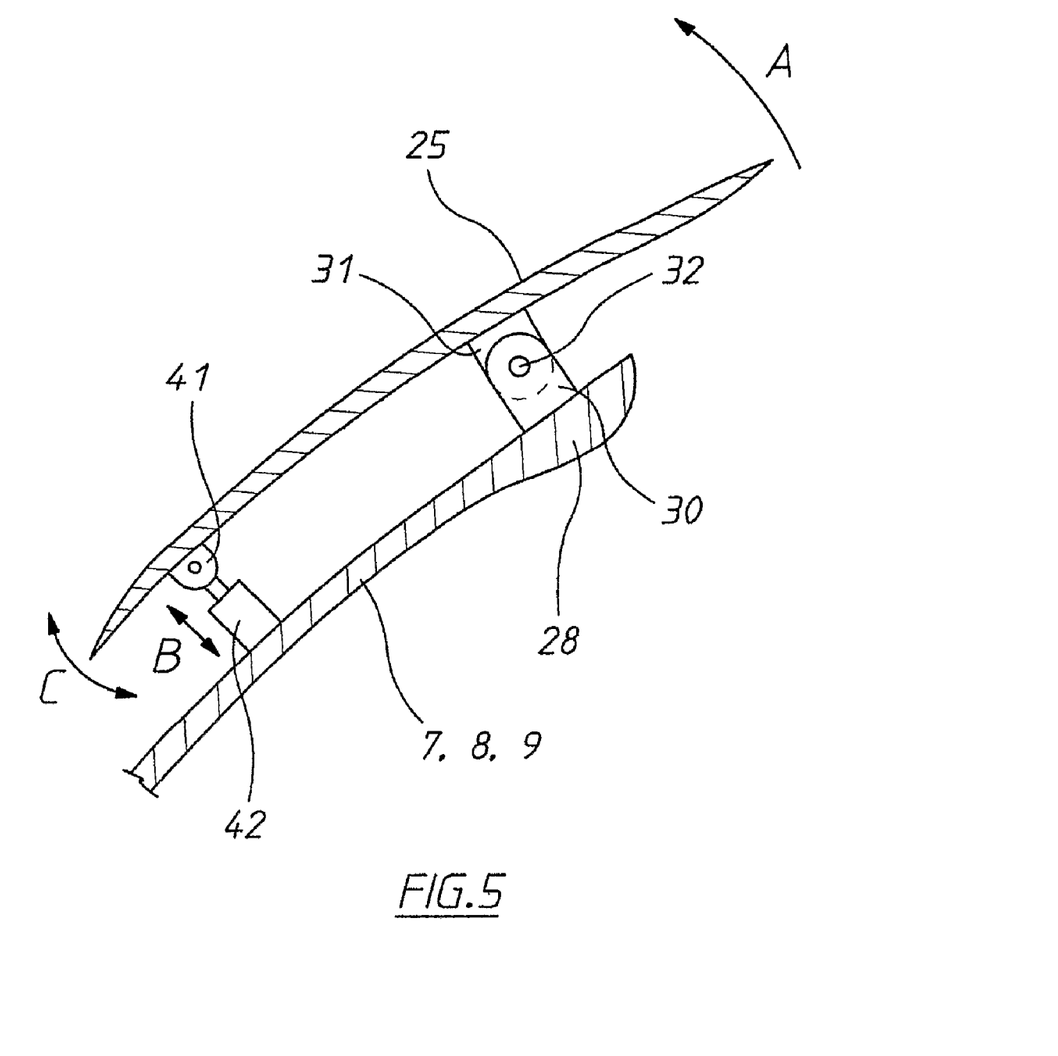
FIG. 5 is a view similar to FIG. 3 but of a second embodiment of the present invention.

In a still further embodiment illustrated in FIG. 5, the auxiliary blade 25 is mounted relative to the main blade 7, 8, 9 by means of a pair of lugs 30 only one of which is illustrated in FIG. 5 and which are formed at the leading face of the trailing edge 18. A single ear 31, which fits between the lugs 30, and a pin 32 which passes through both the lugs 30 and the ear 31. Complete the pivotal mounting for the auxiliary blade 25 is provided.

In addition, the auxiliary blade 25 is connected by means of another ear 41 to an extension device 42 which can take the form of a solenoid with a reciprocable magnetic armature, or a small hydraulic ram, or similar. The extension device 42 is reciprocal as indicated by arrow B in FIG. 5 thereby causing the auxiliary blade 25 to be tilted as indicated by arrow C in FIG. 5.

Figure 6A:
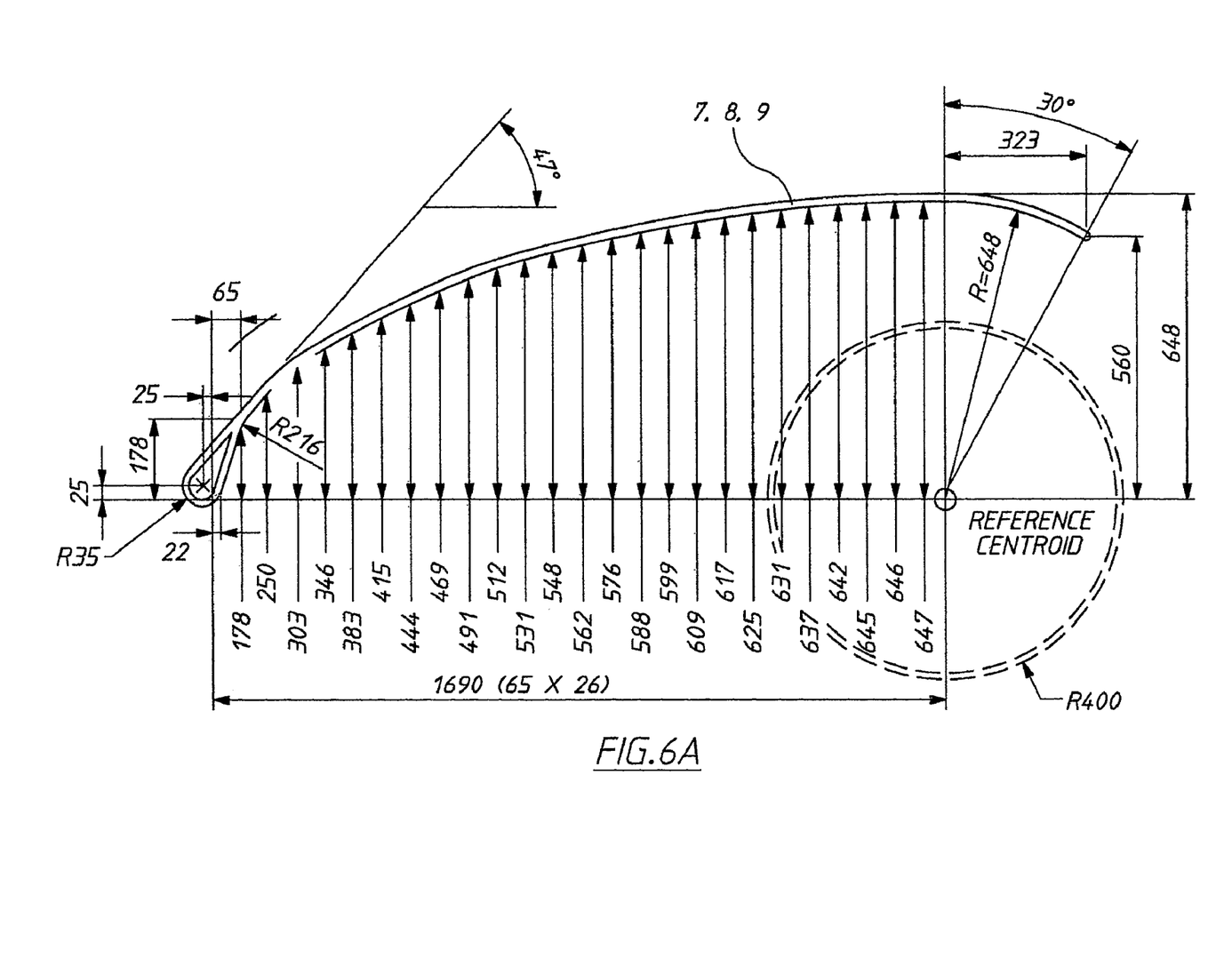
FIG. 6A is a plan view of the lower edge of one of the sails of a vertical axis wind turbine in accordance with a third embodiment.
Figure 6B:
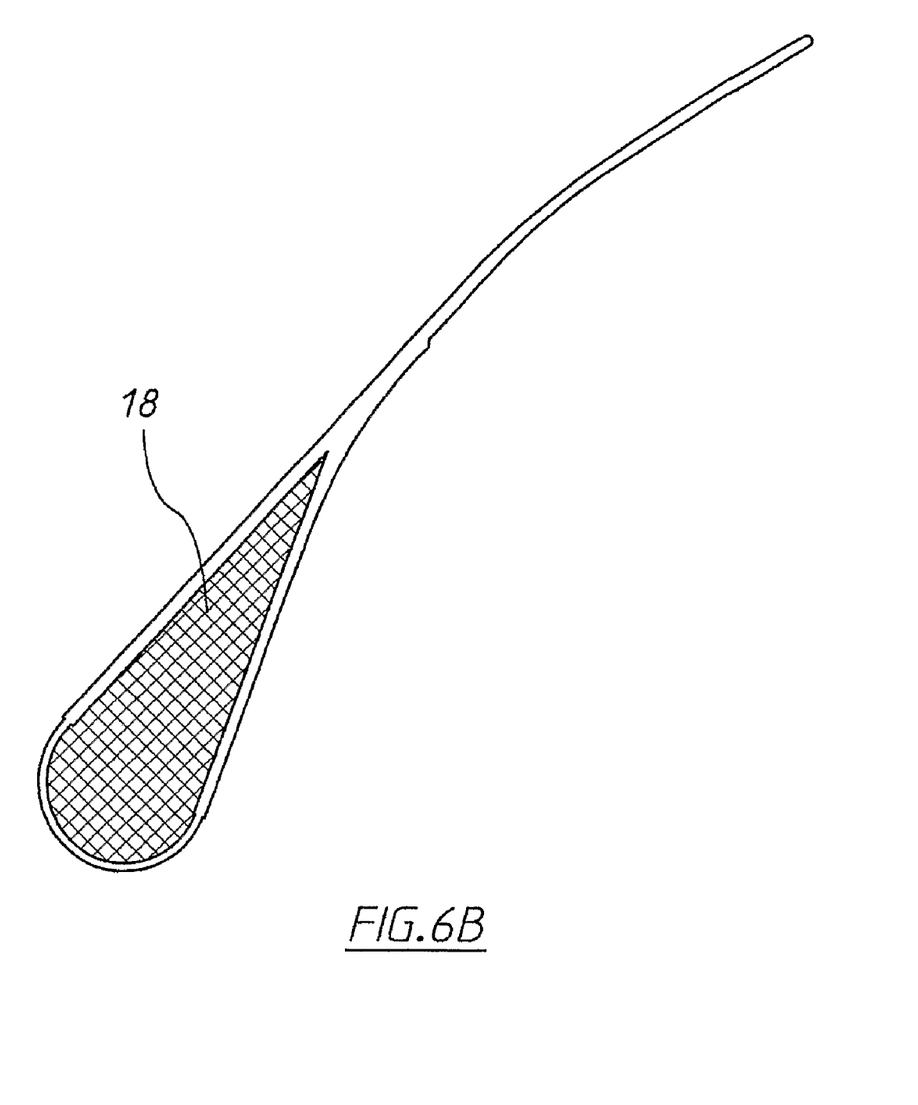
FIG. 6B is an enlarged view of the trailing edge of the blade of FIG. 6A.

Turning now to FIGS. 6A and 6B, the actual dimensions in millimetres are given for a main blade in accordance with another embodiment of the present invention.

The abovedescribed arrangements mean that the thickened portion 28 stiffens the main rail 7, 8, 9 and thereby counteracts any tendency to vibrate or flap, and does not interfere with the flow of air over the main blades 7, 8, 9.

Figure 7:
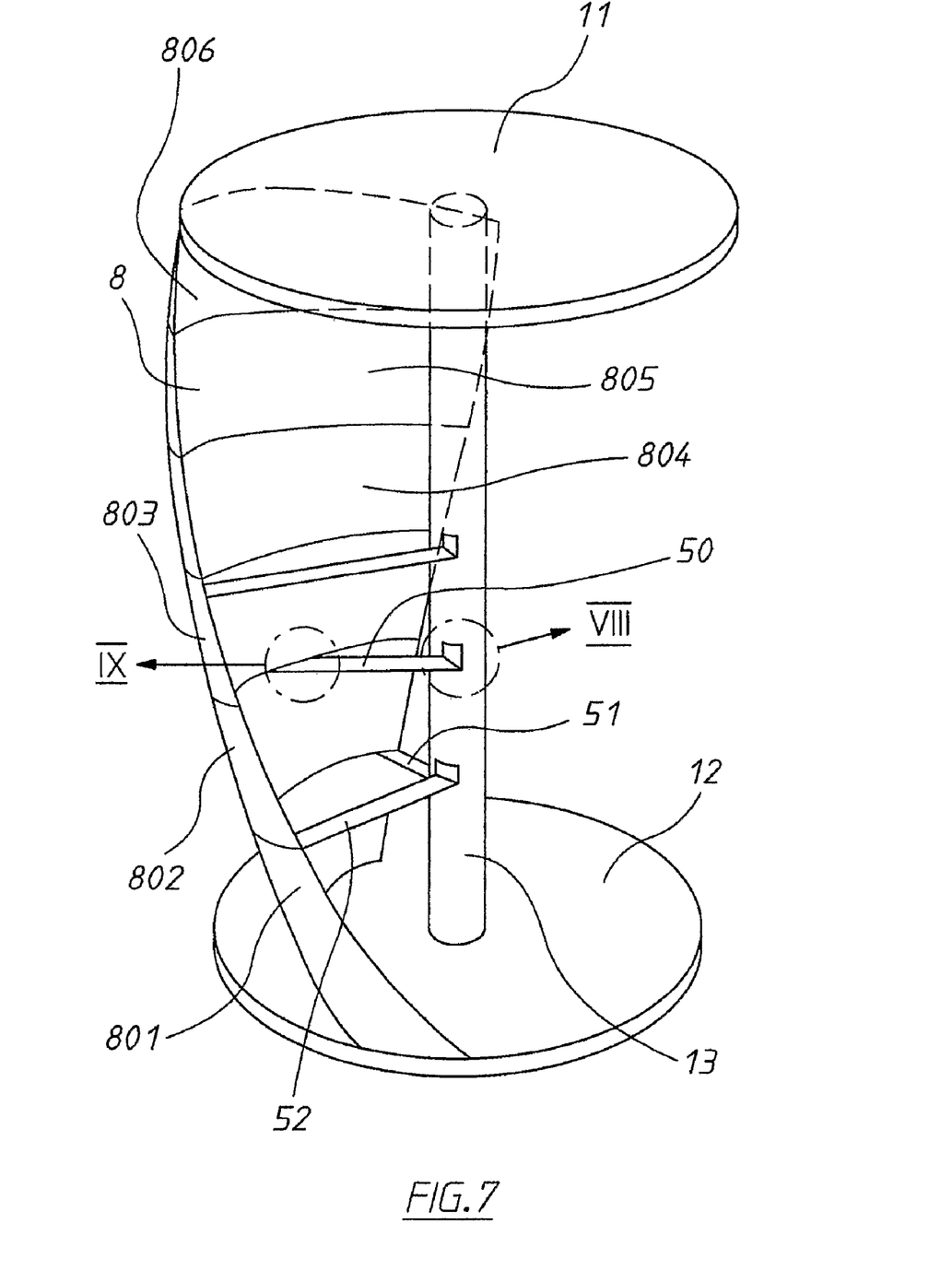
FIG. 7 is a schematic perspective view of the vertical axis wind turbine of FIG. 1 with only one of the three blades being illustrated and only some of the struts being illustrated.
Figure 8:
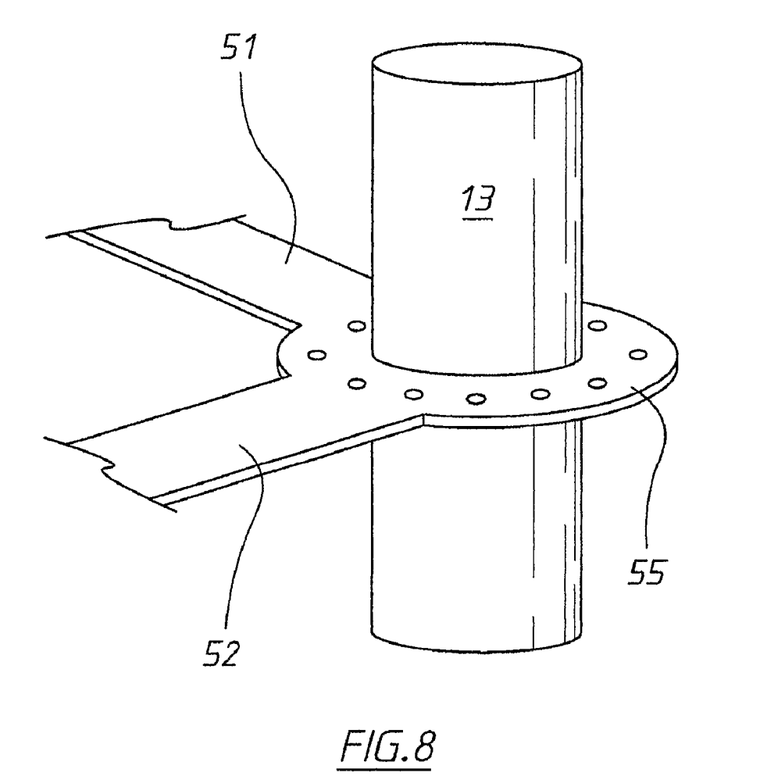
FIG. 8 is a perspective view of the area labelled VIII in FIG. 7 and illustrates the junction of a strut with the central column.
Figure 9:
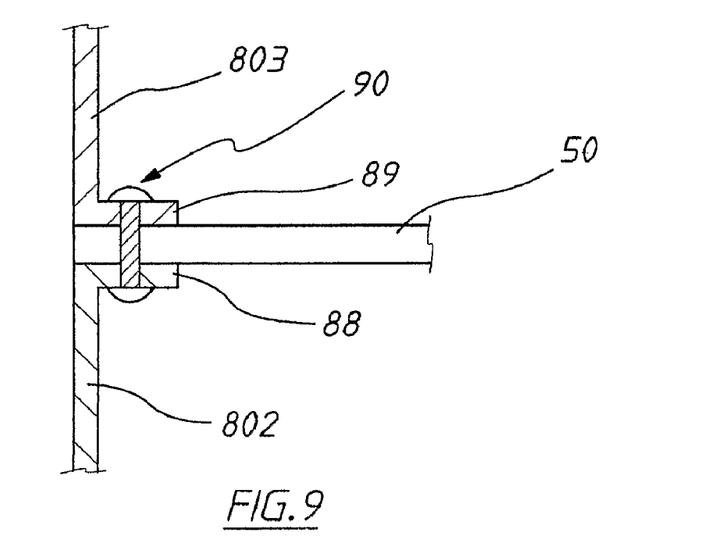
FIG. 9 is a vertical cross-sectional view taken at the area marked IX in FIG. 7 and illustrates the junction between two abutting blade sub-sections.

Turning now to FIG. 7, here only a single blade 8 of the three blades is illustrated. The blade 8 is fabricated from six sub-sections 801-806 each of which has a generally horizontally extending top edge and bottom edge respectively. The upper edge of the uppermost blade sub-section 806 is directly connected to the under surface of the top disc 11, whilst the lower edge of the lowermost blade sub-section 801 is directly connected to the upper surface of the lower disc 12.

Where adjacent blade sub-sections abut, one or more struts 50, 51, 52 extend from the central column 13 to the junction between the blade sub-sections. The struts 50, 51, 52 are formed from a thin blade of metal or composite material. In FIGS. 8 and 9 details of the strut 51 which extends between the central column 13 and the blade sub-sections 801 and 802 are illustrated. The radial inner end of the strut 50 terminates in a flange 55 circumferentially disposed about the column 13 and which enables the radially inner end of the strut 52 to be secured to the central column 13 by any preferred means.

As seen in FIG. 9, the radially outer end of the strut 50 is retained between a top flange 88 on the blade sub-section 802 and a bottom flange 89 on the blade sub-section 803. A fastener 90 secures the flanges 88, 89 and the strut 50 together.

As schematically illustrated in FIG. 7, the struts can be located at various positions along each of the junctions between adjacent pairs of blades sub-sections. For example, at each junction, if desired, there can be a strut 51 at the leading edge and/or a strut 52 at the trailing edge, and/or a strut 50 intermediate the leading and trailing edges the blade 8. Only three of the many possible struts are illustrated in FIG. 7 so as to not overburden the drawing.

It will be appreciated that the struts 50, 51, 52 are formed from a strip of preferably stainless steel having a rectangular transverse cross-section and in which the vertical dimension of the strut is thin relative to the other dimensions of the strut. Accordingly, the struts 50, 51, 52 do not disturb the flow of air past the blades 7, 8, 9 and so the aerodynamic performance of the blades is not diminished to any significant extent by the presence of the struts. However, the struts do provide a strong mounting mechanism which ensures that the blades 7, 8, 9 are securely held and are able to withstand the loads applied to them.

Figure 10:
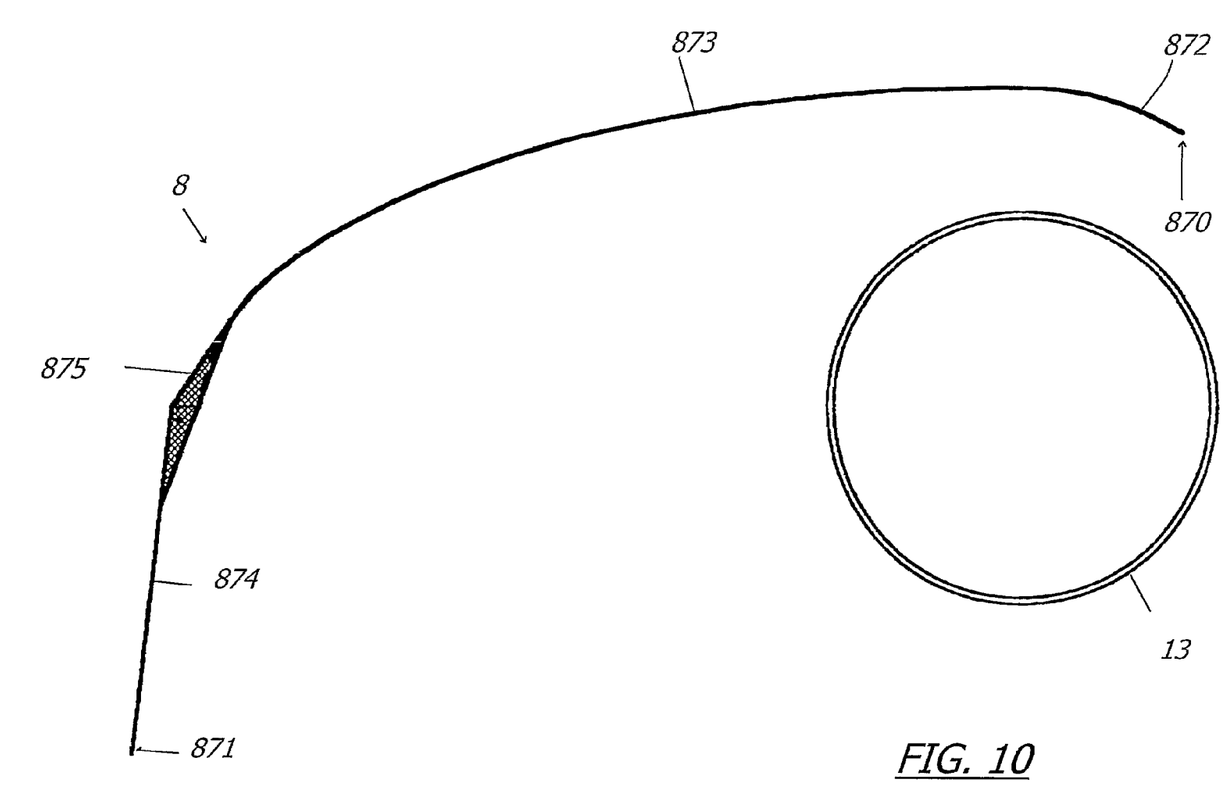
FIG. 10 is cross-sectional top view of a main blade of the vertical axis wind turbine of FIG. 7.

Referring to FIG. 10, there is shown a cross-sectional top view of a main blade 8 of the turbine 1 of FIG. 7. The blade 8 is provided with a vertical twist of 90° about the central core 13. This results in a 90° vertical pitch. However, it will be appreciated that the vertical twist could also be 120°.

In this arrangement, the main blade 8 extends vertically a predetermined length (not shown). The blade 8 extends a width horizontally between a blade mounting end 870 and a blade distal end 871. Although not shown, the blade mounting end 870 is configured to be mounted along the central core 13.

The blade 8 is circularly curved 872 along a predetermined horizontal width from the blade mounting end 870. At the end of the circular curvature, the blade 8 is circular-eliptically curved 873 by a predetermined curvature along a horizontal blade width from the end of the circularly curved section 872.

The blade 8 is substantially flat 874 along a predetermined width of the blade 8 from the end of the circular-eliptically curved section 873 to the blade distal end 871. The horizontal cross-section of the blade 8 along the vertical extend of the blade is substantially uniform.

The blade 8 is twisted about the vertical axis by 90° or 120°. As shown in this FIG. 10, the blade 8 includes a vertically extending reinforcement member 875 extending substantially the length of the blade 8 and disposed intermediate the junction between the circular-eliptically curved section 873 and the substantially flat blade section 874

The foregoing describes only some embodiments of the present invention and modifications, obvious to those skilled in the art, can be made thereto without departing from the scope of the present invention. For example, the auxiliary blade 25 can be mounted either on the leading side, or on the trailing side, of the main blade.

Furthermore, the upper surface of the upper disc 17 can be provided with a generally shallow cone shape so as to ensure runoff of rainwater.

In addition, a vertical axis wind turbine can be formed from two or more wind turbines 1 which are conically mounted and vertically spaced apart so as to form a stack of turbines 1. With reference to FIG. 1, it will be appreciated that the turbines can be vertically stacked to increase the vertical extent of the turbine The term "comprising" (and its grammatical variations) as used herein is used in the inclusive sense of "including" or "having" and not in the exclusive sense of "consisting only of".

The invention claimed is:

1. A vertical axis wind turbine blade extending vertically a predetermined length and extending a width horizontally between a blade mounting end and a blade distal end, said blade mounting end configured for vertically mounting to a central core wherein said blade is circularly curved by a predetermined curvature along a predetermined horizontal width from said blade mounting end, said blade being circularly elliptically curved by a predetermined curvature along a predetermined horizontal width from an end of said circular curving, said blade being substantially flat from an end of said circular curving, said blade being substantially flat from an end of said circular-elliptical curving to said blade distal end, wherein said blade in horizontal cross-section is substantially uniform along said blade length, and further including a vertically extending reinforced vertical member disposed intermediate said circularly-elliptically shaped blade portion and said flat blade portion.

2. A vertical axis wind turbine blade as claimed in claim 1 wherein the vertical ends of said blade are vertically twisted 90° or 120° relative to each other.

* * * * *